(12) United States Patent
Drane

(10) Patent No.: US 9,148,007 B2
(45) Date of Patent: Sep. 29, 2015

(54) RECESSED POKE-THROUGH FITTING

(71) Applicant: Thomas & Betts International, Inc., Wilimington (DE)

(72) Inventor: Mark R. Drane, Germantown, TN (US)

(73) Assignee: THOMAS & BETTS INTERNATIONAL, LLC, Wilmington, DE (US)

( * ) Notice: Subject to any disclaimer, the term of this patent is extended or adjusted under 35 U.S.C. 154(b) by 200 days.

(21) Appl. No.: 13/795,293

(22) Filed: Mar. 12, 2013

(65) Prior Publication Data

US 2014/0131088 A1    May 15, 2014

Related U.S. Application Data

(60) Provisional application No. 61/724,709, filed on Nov. 9, 2012.

(51) Int. Cl.
*H02G 3/08* (2006.01)
*H02G 3/18* (2006.01)
*H02G 3/38* (2006.01)
*H02G 9/00* (2006.01)

(52) U.S. Cl.
CPC ............... *H02G 3/185* (2013.01); *H02G 3/283* (2013.01); *H02G 3/285* (2013.01)

(58) Field of Classification Search
USPC ........... 174/50, 482, 483, 484, 486, 488, 489, 174/490, 37, 39
See application file for complete search history.

(56) References Cited

U.S. PATENT DOCUMENTS

| | | | |
|---|---|---|---|
| 2,996,566 A | 8/1961 | Stas | |
| 3,864,883 A | 2/1975 | McMarlin | |
| 3,956,573 A | 5/1976 | Myers et al. | |
| 4,091,231 A | 5/1978 | Sotolongo | |
| 4,270,318 A | 6/1981 | Carroll et al. | |
| 4,343,411 A | 8/1982 | Chesnut et al. | |
| 4,364,210 A | 12/1982 | Fleming et al. | |
| 4,443,654 A | 4/1984 | Flachbarth et al. | |
| 4,467,577 A | 8/1984 | Licht | |

(Continued)

FOREIGN PATENT DOCUMENTS

| | | |
|---|---|---|
| FR | 2535914 A1 | 5/1984 |
| GB | 2260452 A | 12/1992 |
| JP | 1031357 A | 2/1989 |

OTHER PUBLICATIONS

Hubbell Fire-Rated Poke-Throughs; Featuring Hubbell SystemOne FRPTs; pp. 1-12; printed Mar. 12, 2013.

(Continued)

*Primary Examiner* — Hoa C Nguyen
*Assistant Examiner* — Binh Tran
(74) *Attorney, Agent, or Firm* — Snyder, Clark, Lesch & Chung, LLP

(57) ABSTRACT

A poke-through device includes a tubular main body sized for insertion into a hole formed through a concrete floor. A device frame is mounted in the tubular main body for mounting one or more electrical devices. An intumescent insert is mounted in the tubular main body below the device frame. A junction box assembly is mounted to a bottom end of the tubular main body. A cover assembly is configured to enclose an opening in a top end of the tubular main body. The intumescent insert is mounted in the tubular main body so as to not contact the device frame to allow intumescent material to flow around the device frame in the event of a fire.

28 Claims, 9 Drawing Sheets

(56) References Cited

U.S. PATENT DOCUMENTS

| | | |
|---|---|---|
| 4,654,756 A | 3/1987 | Wilson et al. |
| 4,792,881 A | 12/1988 | Wilson et al. |
| 4,883,924 A | 11/1989 | Hadfield |
| 4,916,800 A | 4/1990 | Harbeke |
| 5,064,969 A | 11/1991 | Bloom |
| 5,121,594 A | 6/1992 | Wuertz |
| 5,220,131 A | 6/1993 | Wuertz |
| 5,272,278 A | 12/1993 | Wuertz |
| 5,455,388 A | 10/1995 | Pratt |
| 5,814,764 A | 9/1998 | Kohaut |
| 5,980,279 A | 11/1999 | Muller |
| 6,018,126 A | 1/2000 | Castellani et al. |
| 6,175,078 B1 | 1/2001 | Bambardekar et al. |
| 6,417,446 B1 | 7/2002 | Whitehead |
| 7,166,798 B2 | 1/2007 | Cole |
| 7,183,501 B2 | 2/2007 | Bowman |
| 7,183,503 B2 | 2/2007 | Bowman et al. |
| 7,285,733 B2 | 10/2007 | Bowman |
| 7,635,110 B2 | 12/2009 | Galasso et al. |
| 8,063,317 B2 | 11/2011 | Bowman |
| 8,242,365 B2 | 8/2012 | Galasso et al. |

OTHER PUBLICATIONS

Thomas & Betts; Catalog and Price Schedule, Jan. 12, 1987.
HUBBELL Wiring Systems; HUBBELL SystemOne; Recessed 6 and 8 Inch Fire-Rated Poke-Throughs; pp. 1-12; printed Mar. 12, 2013.

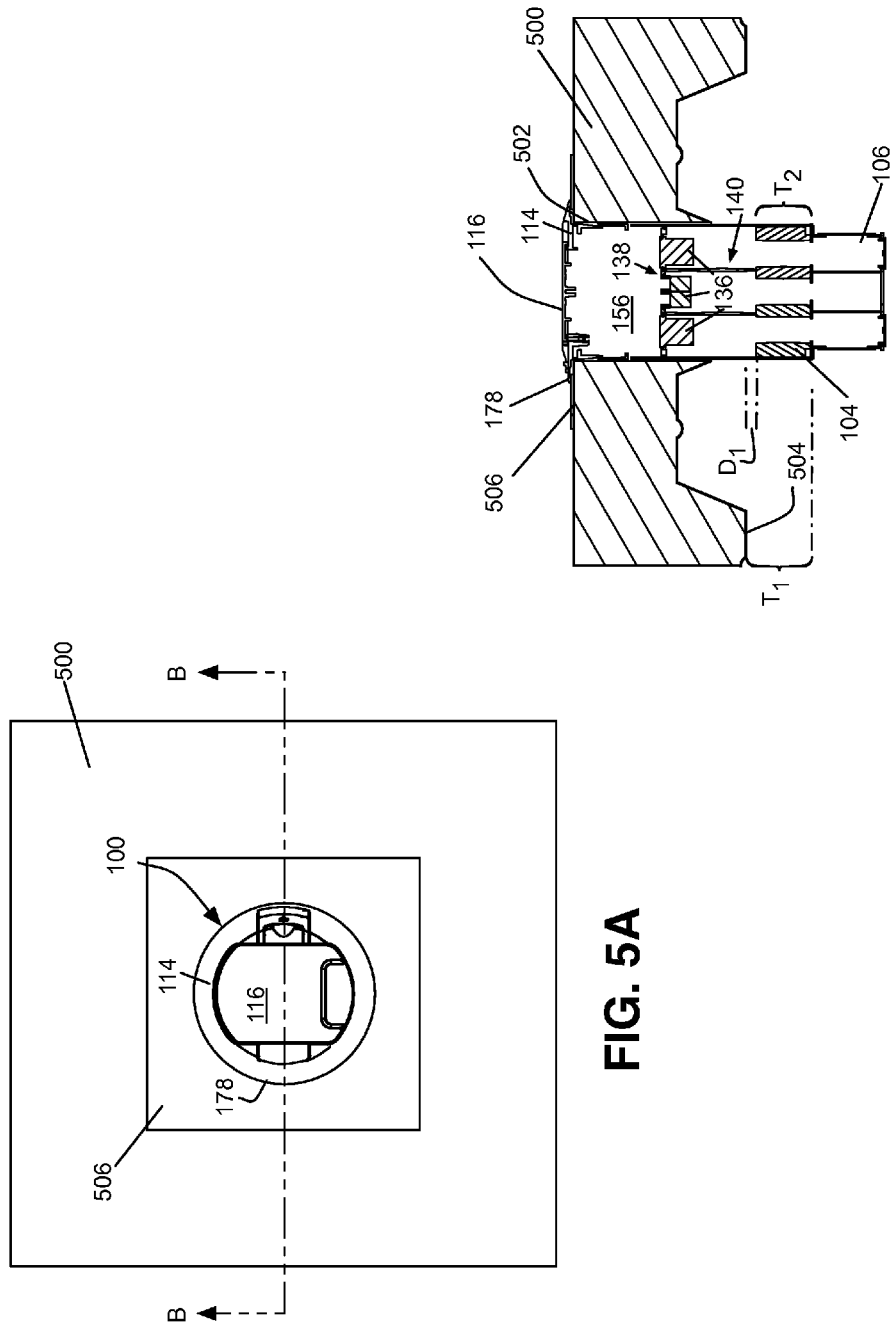

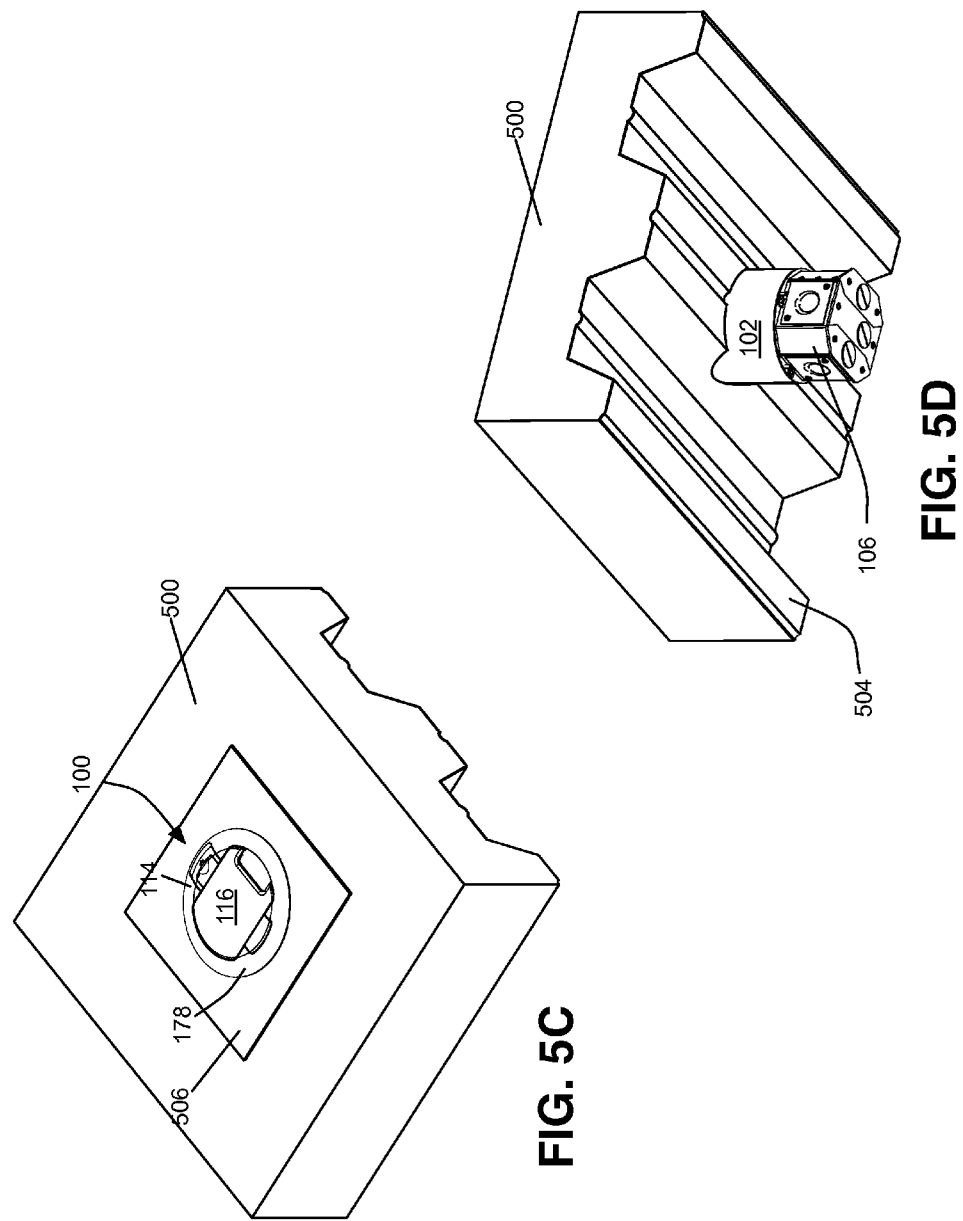

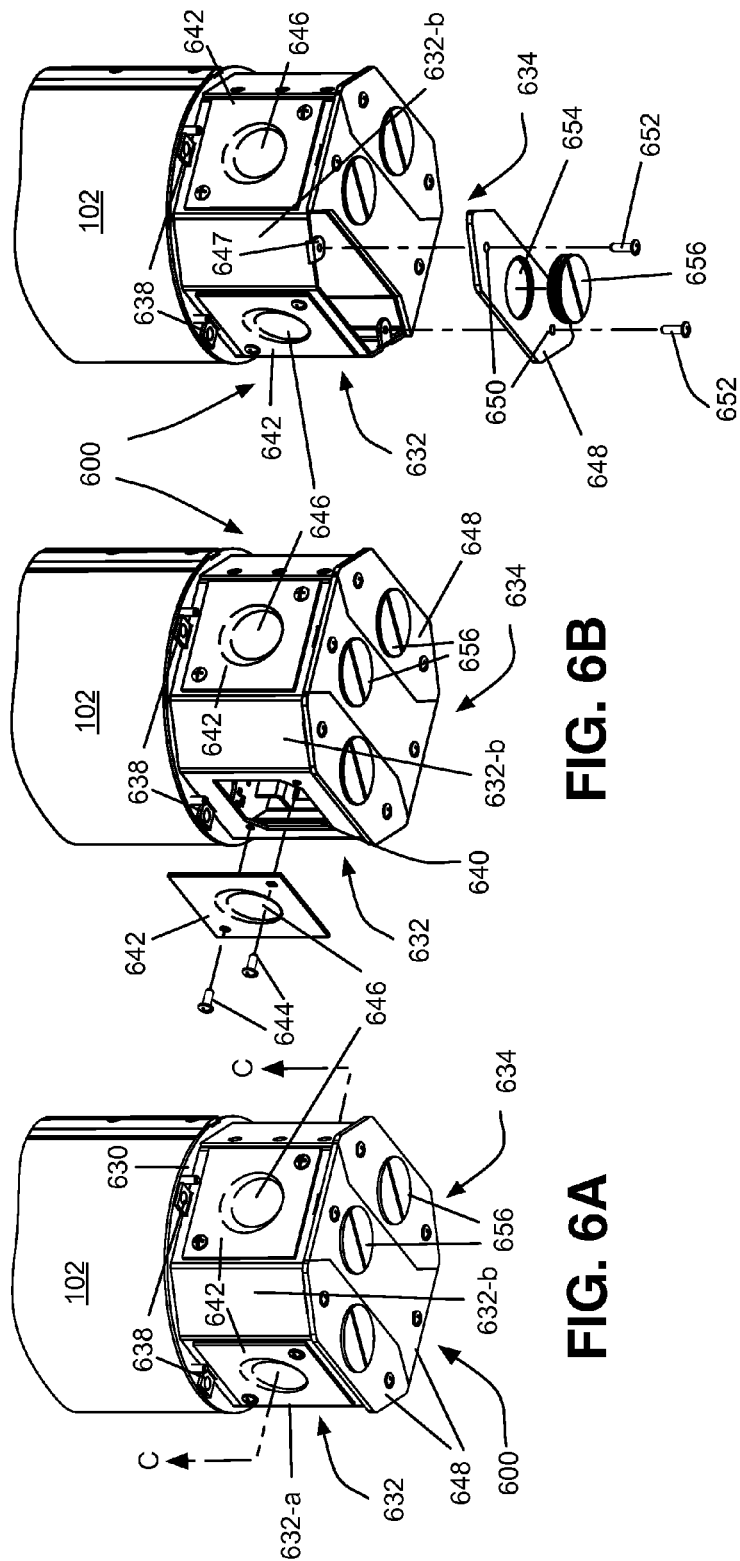

RECESSED POKE-THROUGH FITTING

CROSS-REFERENCE TO RELATED APPLICATION

This application claims priority under 35 U.S.C. §119, based on U.S. Provisional Patent Application No. 61/724,709, filed on Nov. 9, 2012, the disclosure of which is hereby incorporated by reference herein.

BACKGROUND

On-floor conduits are used to convey electrical power and communication lines to floor locations that are not within the original architectural and electrical planning of a facility, such as a multi-floor concrete building. Such on-floor conduits are unsightly and may also pose a safety hazard to persons working in such area.

One technique for avoiding the use of on-floor conduits involves the drilling of a hole through the concrete floor at a desired location and the routing of power or communication lines beneath the floor and then up through the hole. Transition apparatus known as "poke-throughs" have been developed for use in such interfloor holes. To protect individuals and property, poke-through devices are subject to electrical and fire safety considerations. Among these are two fire-related requirements. First, the poke-through device cannot function as a chimney or fire-advancing flue in the event of a fire on the lower floor. Second, the poke-through cannot function as a floor-to-floor heat conduction path.

These safety requirements have largely been met through the use of intumescent material. For example, a sheet of intumescent material may be wired in place about a housing. The intumescent material reacts to expand to fill the interfloor hole in the event of fire. Furthermore, thermally insulating materials have been interposed between metallic (and therefore heat conductive) portions of the poke-through devices.

BRIEF DESCRIPTION OF THE DRAWINGS

FIG. 5A is a top view of the poke-through device of FIG. 1 installed within a floor;

FIG. 5B is a cross-sectional view of the poke-through device of FIG. 5A, taken along the line B-B in FIG. 5A;

FIGS. 5C and 5D are top and bottom isometric views, respectively, of the poke-through device of FIG. 5A;

FIGS. 6A-6C are bottom, isometric views of an exemplary junction box consistent with embodiments described herein.

DETAILED DESCRIPTION OF THE PREFERRED EMBODIMENTS

The following detailed description refers to the accompanying drawings. The same reference numbers in different drawings may identify the same or similar elements.

Consistent with implementations described herein, a poke-through device is provided for providing access to an electrical or communication device (or devices) through a concrete floor. Such electrical or communication devices are generally referred to as an "electrical device" herein for simplicity. As described below, the poke-through device may include a generally tubular main body for retaining the electrical device and an intumescent insert therein. Consistent with embodiments described herein, the intumescent insert is initially mounted in a portion of the main body that projects below a level of the concrete floor. The electrical device and intumescent insert are maintained in a spaced relationship to allow the intumescent material to flow around and through the electrical device in the event of a fire.

In addition, as described herein, the poke-through device may include a barb ring mounted vertically above the main body, between the main body and a cover support frame. The barb ring may be formed of a plastic or polymer material that melts or deforms in the event of a fire to aid the intumescent in sealing the opening in the concrete floor. In some embodiments, the barb ring includes vented slots at the interface between the barb ring and the main body to provide openings for the intumescent material to flow through during a fire.

Once installed within the concrete floor, a flush-mount cover mounting ring is secured to the cover support frame over the concrete floor. A removable cover is mounted in the cover mounting ring. In operation, the cover is removed to provide access to the electrical device.

Figure 1:
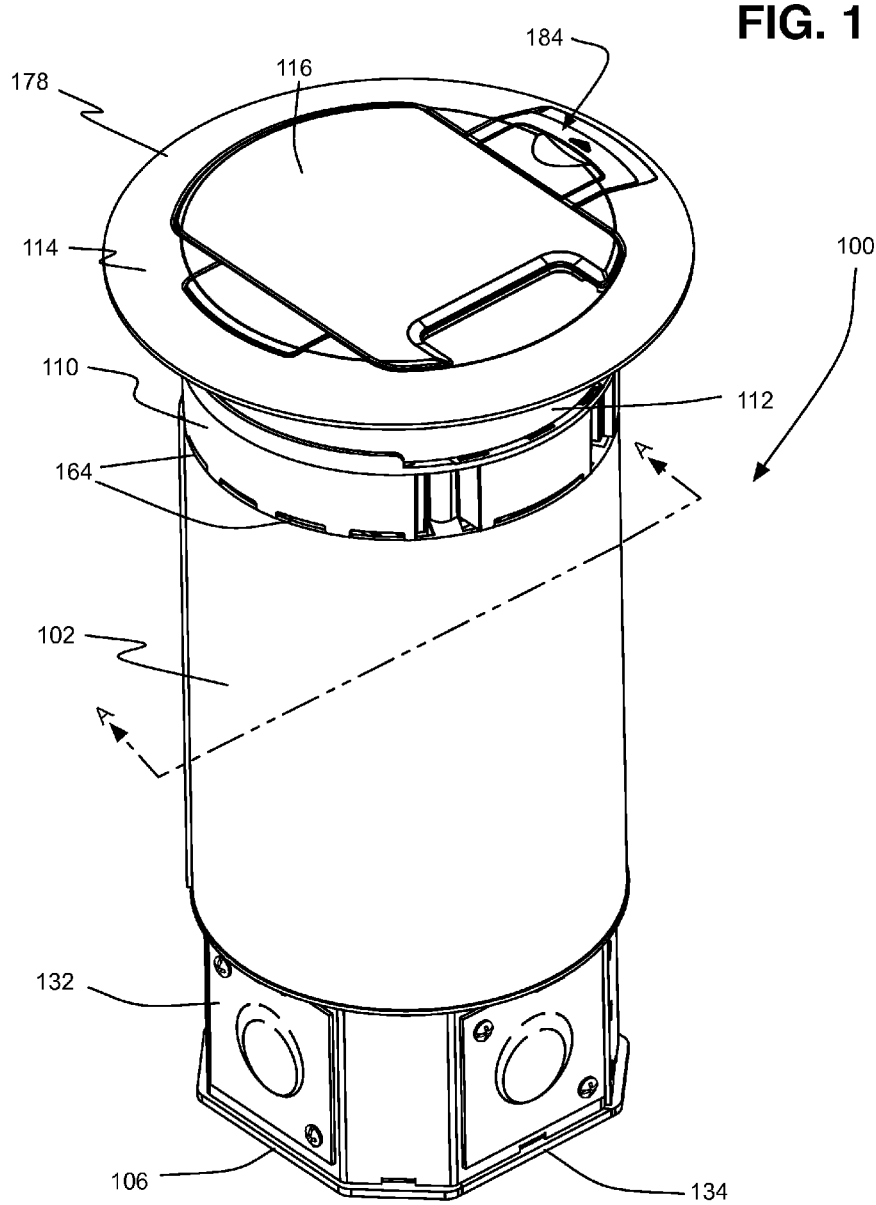
FIG. 1 is an isometric view of a poke-through device consistent with embodiments described herein in an assembled configuration.
Figure 2A:
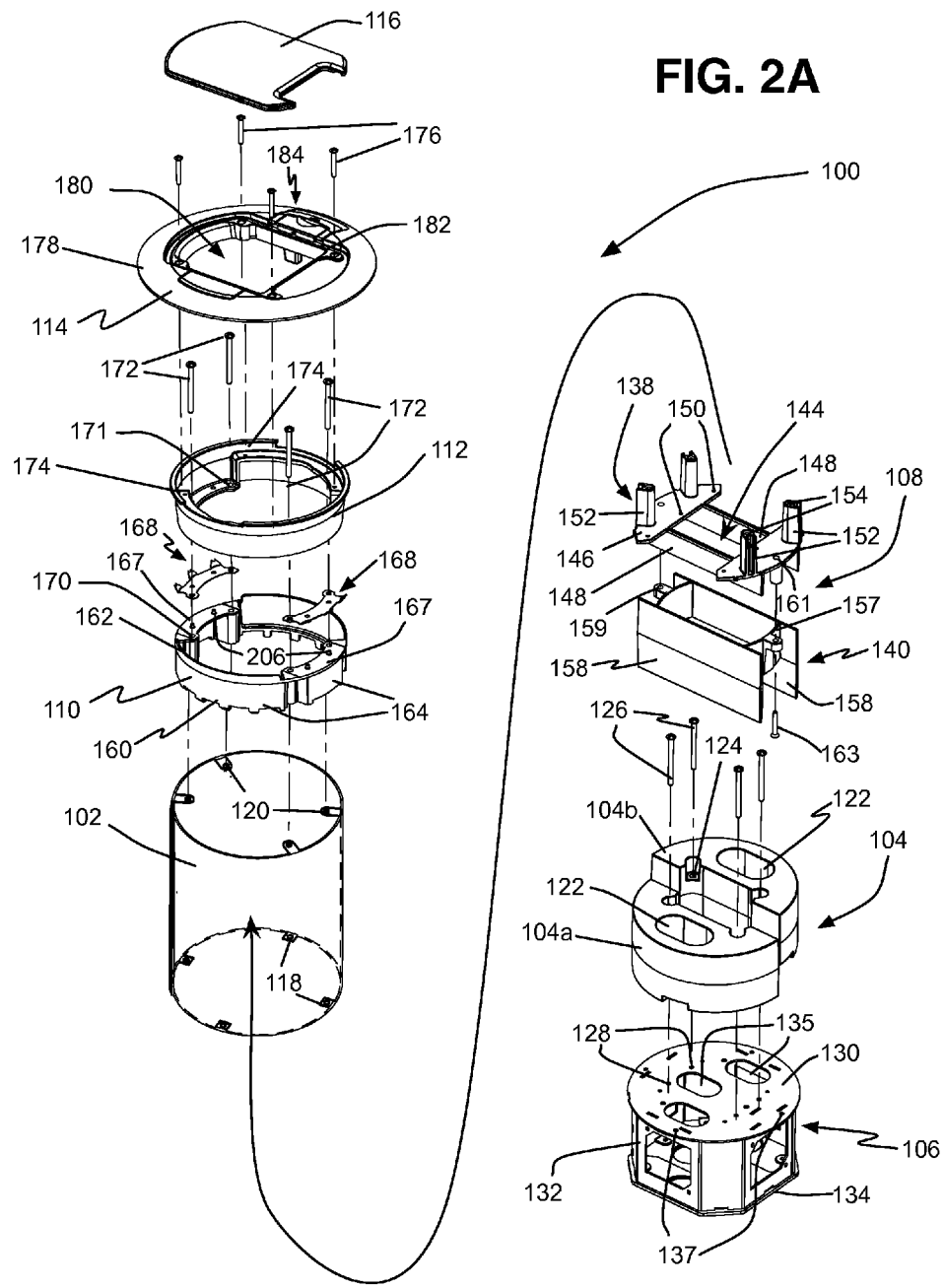
FIG. 2A is an exploded, isometric view of the poke-through device of FIG. 1.
Figure 3:
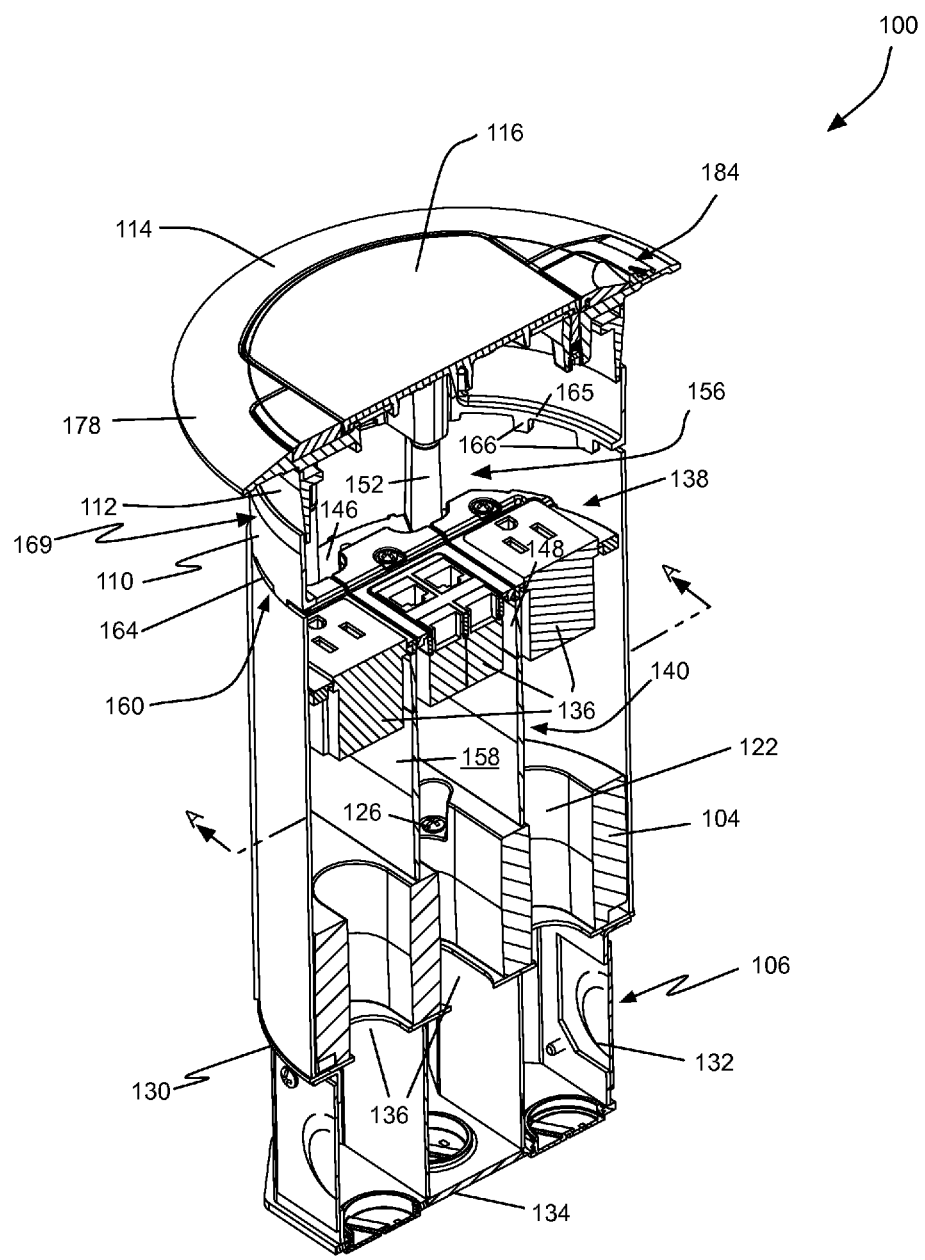
FIG. 3 is an isometric, cross-sectional view of the poke-through device of FIG. 1, taken along the line A-A in FIG. 1.
Figure 4:
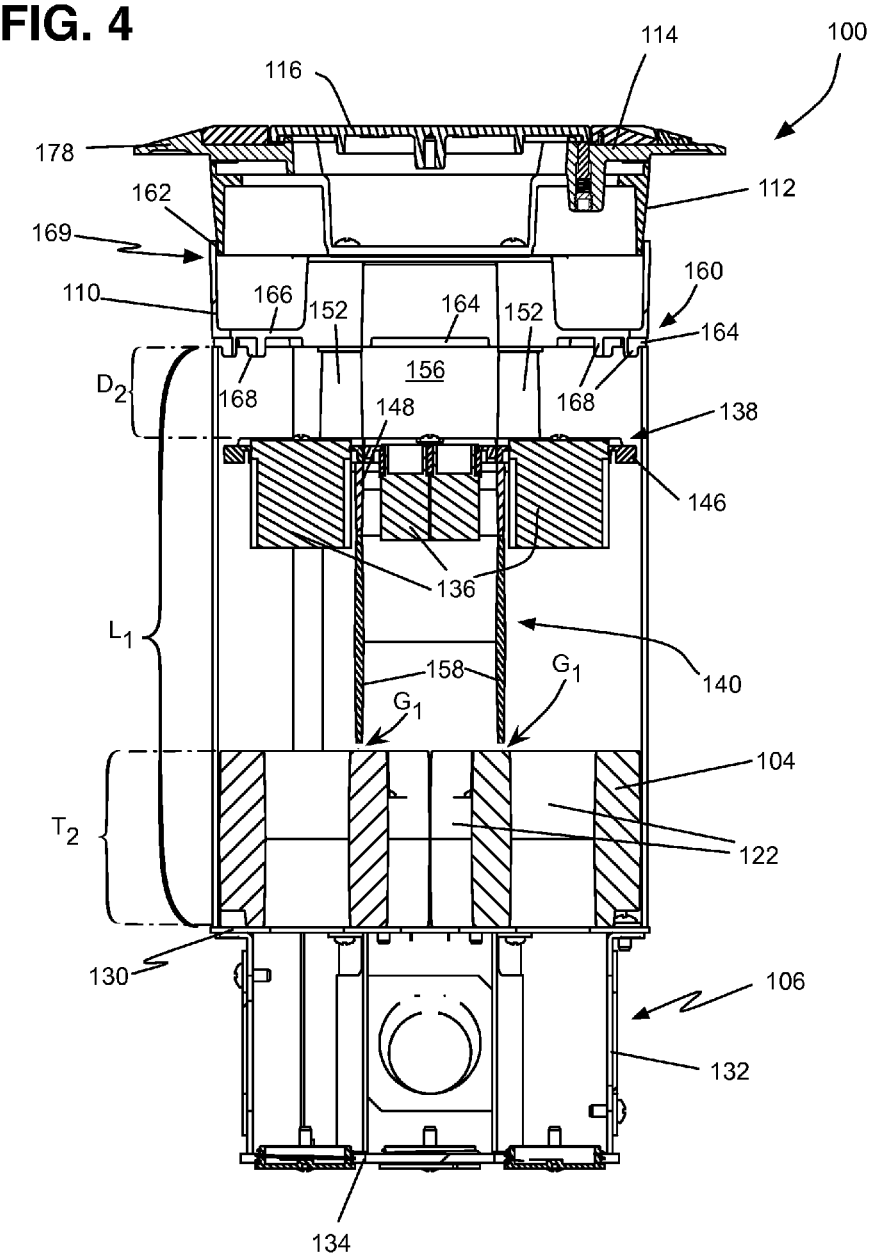
FIG. 4 is a cross-sectional view of the poke-through device of FIG. 1, taken along the line A-A in FIG. 1.

FIG. 1 is an isometric view of a poke-through device 100 consistent with embodiments described herein in an assembled configuration. FIG. 2A is an exploded, isometric view of poke-through device 100. FIG. 3 is an isometric, cross-sectional view of poke-through device 100. FIG. 4 is a cross-sectional view of poke-through device 100. FIG. 5A is a top view of poke-through device 100 installed within a floor 500. FIG. 5B is a cross-sectional view of poke-through device 100 taken along the line B-B in FIG. 5A. FIGS. 5C and 5D are top and bottom isometric views, respectively, of poke-through device 100 installed within floor 500.

As shown in FIG. 2A, poke-through device 100 may include a tubular main body 102, an intumescent insert 104, a junction box 106, a device frame 108, a barb mounting ring 110, a cover support frame 112, a cover mounting plate 114, and a cover 116. As shown in FIG. 4, tubular main body 102 may include a length $L_1$ that is such that, when installed in a hole 502 in floor 500, tubular main body 102 projects below a lower surface 504 of floor 500 by a thickness $T_1$. In some embodiments, tubular main body 102 may be formed of a metal, such as aluminum or steel or other rigid material. In addition, as shown in FIG. 2A, tubular main body 102 may include bottom mounting tabs 118 and top mounting tabs 120 for securing tubular main body 102 to junction box 106 and cover support frame 112/barb mounting ring 110, respectively. Mounting tabs 118/120 may project radially inwardly from tubular main body 102 in a defined, spaced relation relative to each other.

As shown in FIG. 2A, intumescent insert 104 may include a generally cylindrical body sized for insertion within tubular main body 102 above bottom mounting tabs 118. That is, the outside diameter of intumescent insert 104 may be similar to or slightly smaller than an inside diameter of tubular main body 102. As shown in FIG. 5B, consistent with embodiments described herein, intumescent insert 104 may be have a thickness $T_2$ such that an upper surface of intumescent insert 104 is provided below a lower surface 504 of concrete floor 500 by a distance $D_1$.

In some implementations, as shown in FIG. 2A, intumescent insert 104 may be formed as two substantially identical halves 104a and 104b. Such a configuration makes it easier to insert intumescent insert 104 into tubular main body 102 and past bottom mounting tabs 118. Following insertion of each half 104a and 104b into tubular main body 102, the halves may be aligned above bottom mounting tabs 118 and rotated into alignment with junction box 106, as described below.

Intumescent insert 104 may be formed of an initially rigid intumescent material capable of expanding in volume within poke-through device 100 upon exposure to elevated temperatures resulting from a fire. In the event of a fire, the expanded intumescent material acts as a firestop to prevent the spread of fire between floors via poke-through device 100. As described in detail below, several aspects of poke-through device 100 increase the efficacy of intumescent insert 104 in preventing or minimizing the spread of a fire between floors in a building.

As shown in FIG. 2A, intumescent insert 104 may include a plurality of wireway openings 122 configured to align with the electrical devices mounting in device frame 108 (described above). More specifically, each wireway opening 122 may provide a pathway through intumescent insert 104 between junction box 106 and the electrical devices through which to route electrical or communications wires or cables. Although three wireway openings 122 are illustrated in FIG. 2A, it should be understand that any suitable number of wireway openings 122 may be employed, including multiple wireway openings 122 for individual electrical devices or a single wireway opening 122 for multiple electrical devices. Moreover, although the present description refers generally to running of electrical power and data wires or cables, it is to be understood that fiber optic cables or similar structures may also be used in the manner described herein.

In addition, as shown in FIG. 2A, intumescent insert 104 may include a plurality of mounting holes 124 formed therein. Screws 126 may be inserted through mounting holes 124 and into corresponding insert mounting holes 128 in junction box 106 to secure intumescent insert 104 to a top plate 130 of junction box 106. In one implementation, mounting holes 124 in intumescent insert 104 may be configured to align with device openings in device frame 108, as described above. This configuration increases the ease with which intumescent inset 104 is secured to junction box 106 during assembly.

As shown in FIG. 2A, junction box 106 comprises a substantially circular top plate 130, sidewalls 132, and bottom 134. Top plate 130 may be sized to correspond to tubular main body 102. That is, a diameter of circular top plate 130 is sized so that, upon assembly, top plate 130 in junction box 106 covers a bottom opening of tubular main body 102. As described briefly above, circular top plate 130 may include insert mounting holes 128 configured to align with mounting holes 124 in intumescent insert 104. In addition, circular top plate 130 may include wireway openings 135 configured to align with wireway openings 122 in intumescent insert 104 for providing a pathway between wireway openings 122 and an interior of junction box 106 to allow for the routing of wires to and from the electrical devices mounted to device frame 108 (described below).

Circular top plate 130 may also include main body mounting holes 137 configured to align with bottom mounting tabs 118 in tubular main body 102. During assembly of poke-through device 100, screws (not shown) may be used to secure junction box 106 to tubular main body 102 via main body mounting holes 137 and bottom mounting tabs 118.

As shown in FIG. 2A, junction box 106 may include various openings in sidewalls 132 and bottom 134 for accommodating the receipt of one or more wiring conduits (not shown) and for facilitating wiring connections between device wires and wires in the wiring conduits.

Figure 6D:
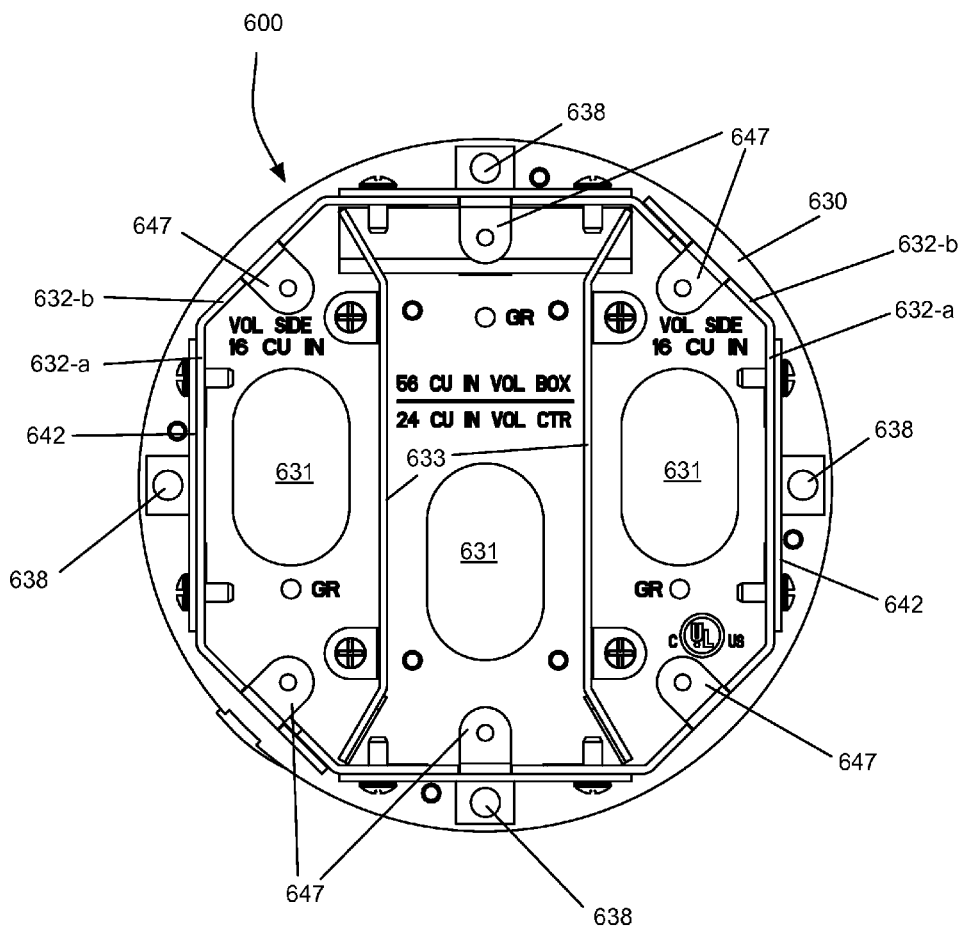
FIG. 6D is a cross-sectional view of the junction box of FIGS. 6A-6C taken along the line C-C in FIG. 6A.

FIGS. 6A-6C are bottom isometric views of an exemplary junction box 600 consistent with embodiments described herein. FIG. 6D is a cross-sectional view of junction box 600 taken along the line C-C in FIG. 6A. As shown, junction box 600 includes circular top plate 630, sidewalls 632, junction box dividers 633, and bottom 634 that together define a number of interior cavities within junction box 600.

Similar to junction box 106 described above, circular top plate 630 in junction box 600 includes a plurality of main body mounting holes 638 configured to align with bottom mounting tabs 118 in tubular main body 102. In addition, as shown in FIG. 6D, circular top plate 630 includes a one or more wireway openings 631 configured to align with wireway openings 122 in intumescent insert 104, as described above in relation to junction box 106. Wireway openings 631 provide a pathway for routing of wires or cables to poke-through device 100 and further provide a pathway for allowing intumescent material from intumescent insert 104 to flow into junction box 600 in the event of a fire.

As also shown in FIG. 6D, junction box dividers 633 may be mounted to circular top plate 630 to divide junction box 600 into a number of cavities corresponding to a number of wireway openings 122 or bottom plates 648 (described below). In the embodiment of FIGS. 6A-6D, junction box 600 includes two junction box dividers 633 (FIG. 6D), to thereby form three corresponding cavities within junction box 600. As shown in FIG. 6D, junction box dividers 633 may project within junction box 600 in a direction perpendicular to top plate 630 and may include angled portions that correspond to angled portions of bottom plates 648 (described below). Dividing junction box 600 via junction box dividers 633 isolates wires or cables from tangling with each other and further minimizes electrical interference between wires.

In one embodiment, as shown in FIGS. 6A-6C, side walls 632 may be provided in a substantially octagonal configuration to include main sidewalls 632-a and angled corner side walls 632-b positioned between main sidewalls 632-a. This octagonal configuration is such that main body mounting holes 638 are exposed outside of main sidewalls 632-a on an underside of circular top plate 630, while maximizing an interior volume of junction box 600, thereby enabling securing of junction box 600 to tubular main body 102 from the exterior of junction box 600 (e.g., via screws or the like).

Consistent with embodiments described herein, each of main sidewalls 632-a includes an opening 640 therein. Each opening 640 is covered by a removable cover 642 secured to sidewall 632-a by screws 644. As shown in FIG. 6A, each cover 642 includes a knock-out portion 646 thereon. When it is desired to connect wiring conduits to junction box 600 via one or more sidewalls 632-a, the appropriately sized knock-out in knock-out portion 646 may be removed to create an opening in sidewall 632 to facilitate insertion of a wiring conduit therethrough.

However, when wiring conduit(s) are connected via bottom 634 (as described below), one or more openings 640 may be used to facilitate wiring connections within junction box 600. In this embodiment, one or more covers 642 may be removed and then reinstalled following completion of the wiring connections.

As shown in FIG. 6C, sidewalls 632 may include bottom plate mounting tabs 646 that project inwardly from a bottom edge of a number of sidewalls 632. For example, each of the four angled sidewalls 632-b and two of the main sidewalls 632-a may be provided with bottom plate mounting tabs 647.

As shown in FIG. 6A, bottom 634 may include a plurality of bottom plates 648 that, when installed onto sidewalls 632, together cover an entirety of the cavity formed by sidewalls 632.

In particular, each bottom plate 648 may be provided with mounting holes 650 formed therein that align with corresponding bottom plate mounting tabs 647, as shown in FIG. 6C. During assembly, bottom plates 648 may be positioned over junction box 600 and secured to bottom plate mounting tabs 647 by screws 652. As shown in FIG. 6A, each bottom plate 648 includes an opening 654 configured to receive a conduit plug 656 therein. For example, each conduit plug 656 may be provided with male threads for engaging corresponding female threads formed within openings 654. When it is desired to connect wiring conduits to junction box 600 via one or more bottom plates 648, respective ones of conduit plugs 656 may be removed (e.g., unscrewed) to facilitate insertion of a wiring conduit through the corresponding opening 654.

However, when wiring conduit(s) are connected via other openings 654 or via knock-out portions 646 in removable covers 642, one or more bottom plates 648 may be removed to facilitate wiring connections within junction box 600 via the resulting opening. Following completion of the wiring connections, the removed bottom plates 648 are reinstalled.

Returning to FIGS. 1-4, device frame 108 (FIG. 2A) functions to secure one or more electrical devices 136 (FIG. 3) to poke-through device 100 and is configured for insertion within tubular main body 102. In one embodiment, device frame 108 includes a two-part configuration comprising a device mounting platform 138 and a voltage divider 140. Device mounting platform 138 and voltage divider 140 may be formed of different materials, to minimize heat transfer through poke-through assembly 100. For example, in one implementation, device mounting platform 138 may be formed of a conductive metal, such as zinc, and voltage divider 140 may be formed of an insulative material, such as a thermoplastic polymer.

As shown in FIG. 2A, device mounting platform 138 may be configured to define a number of device receiving openings 144 within poke-through device 100. For example, device mounting platform 138 may include a planar top portion 146 and a number of divider portions 148 that project downwardly from planar top portion 146. In the embodiment shown in FIGS. 1-4, device mounting platform 138 is configured to receive three electrical devices 136, such as two electrical outlet receptacles and a multiport communications receptacle (as shown in FIG. 3). However, it should be understood that device mounting platform 138 may be configured to include any suitable number of divider portions 148 for receiving any suitable number of electrical devices 136.

Planar top portion 146 may include mounting holes 150 for receiving screws to secure electrical devices 136 to device mounting platform 138. As shown in FIG. 2A, device mounting platform 138 may include a number of standoffs 152 that project upwardly from planar top portion 146. Standoffs 152 include mounting holes 154 on the ends thereof. Mounting holes 154 are configured to align with corresponding mounting holes in top mounting tabs 120. As shown in FIG. 4, upon assembly of poke-through device 100, standoffs 152 maintain a distance $D_2$ between a top of tubular main body 102 and planar top portion 146 of device mounting platform 138. This distance (in addition to an area provided by barb mounting ring 110 and cover support frame 112, described below) is sufficient to form a handwell cavity 156 within poke-through device 100 that can accommodate the insertion of electrical plugs or communication jacks into electrical devices 136.

Accordingly, as shown in FIG. 5B, electrical devices 136 are recessed below the plane defining the surface of the floor 500.

In addition, consistent with embodiments described herein, planar top portion 146 may be sized to include a maximum diameter that is less than an internal diameter of tubular main body 102. Accordingly, upon installation, device frame 108 does not contact tubular main body 102. This configuration allows intumescent material from intumescent insert 104 to freely flow through and around device frame 108 and into handwell cavity 156 in the event of a fire.

Voltage divider 140 includes a body 157 with sidewalls configured to correspond to divider portions 148 in device mounting platform 138. In addition, voltage divider may include divider portions 158 that are secured to body 157 and project downwardly from device mounting platform 138. Divider portions 158 in voltage divider 140 are configured to align with divider portion 148 in device mounting platform 138. As shown in FIG. 2A, body 157 may include mounting holes 159 that align with corresponding mounting holes 161 in planar top portion 146 of device mounting platform 138 (e.g., via screws) to facilitate securing of voltage divider 140 to device mounting platform 138 via screws 163.

Consistent with embodiments described herein, upon assembly of poke-through device 100, divider portions 148 that project downwardly from device frame 108 are configured to project toward intumescent insert 104 but to not contact or bear onto intumescent insert 104. More particularly, upon assembly, divider portions 148 of device frame 108 are suspended over intumescent insert 104 and are separated from intumescent insert 104 by a gap $G_1$, as shown in FIG. 4. This gap allows the intumescent material in intumescent insert 104 to flow around and between divider portions 148 and other components of device frame 108 in the event of a fire.

As shown in FIG. 2A, barb mounting ring 110 may include a generally tubular structure that includes a lower surface 160 configured to sit on top of tubular main body 102 and an upper surface 162 configured to engage cover support frame 112. As shown in lower surface 160 of barb mounting ring 110 includes a number of radially spaced notches 164 that allow intumescent material from intumescent insert 104 to flow from within tubular main body 102 outward into contact with concrete floor 500. As shown in FIG. 4, in one embodiment, lower surface 160 may include an inwardly projecting rim 165 having a plurality of body engagement portions 166 projecting downwardly therefrom. Spaces between these body engagement portions 166 form notches 164.

Figure 2B:
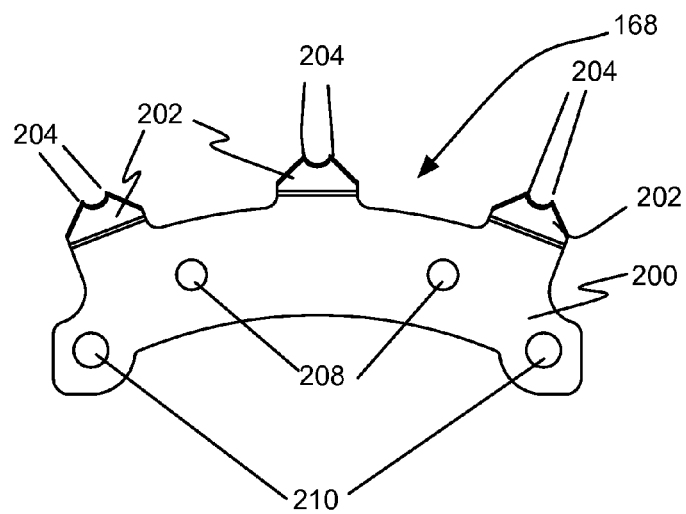
FIGS. 2B and 2C are top and rear isometric views of the barb element of FIG. 2A.
Figure 2C:
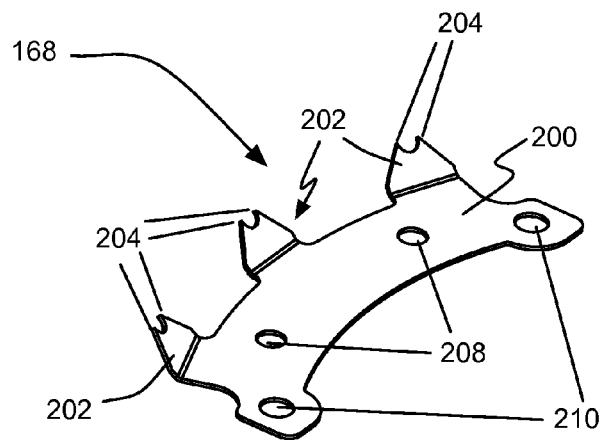

As shown in FIG. 2A, barb mounting ring 110 may include a barb engagement portion 167 for receiving one or more barb assemblies 168 therein. In one implementation, barb assemblies 168 are formed of a rigid material, such as metal and are sandwiched or otherwise secured between barb mounting plate 110 and cover support frame 112. FIGS. 2B and 2C are top and rear isometric views of exemplary barb assemblies 168. As shown in FIGS. 2B and 2C, each barb assembly 168 includes a body portion 200 and a plurality of barb portions 202. Body portion 200 may include a generally planar structure configured for receipt within barb engagement portion 167 of barb mounting ring 110. In one embodiment, an outer periphery of body portion 200 may be curved to align with the outer periphery of barb mounting ring 110.

As shown in FIG. 2C, barb portions 202 are configured to project upwardly (e.g., at an upward angle) from body portion 200. Barb portions 202 include one or more points 204 at the distal end (e.g., away from body portion 200). For example, each barb portion 202 in FIGS. 2A-2C includes two points 204. Although two points 204 per barb portion 202 is disclosed in FIGS. 2A-2C, it should be understood that any suitable number of points may be used.

Following assembly of poke-through device 100, barb portions 202 may be configured to project beyond the outside diameter of tubular main body 102, barb mounting frame 110, cover support frame 112. The upwardly angled configuration of barb portion 202 is configured to cause points 204 allow poke-through device 100 to be inserted into hole 502 in floor 500 (e.g., inserted in a direction opposite to the upward direction of barb portions 202. However, once inserted, points 204 on barb portions 202 are configured to frictionally engage the sidewalls of hole 502 and prevent poke-through device 100 from being easily removed from hole 502.

As shown in FIG. 2A, in one embodiment, barb engagement portion 167 in barb mounting ring 110 may include one or more alignment pins 206 projecting upwardly therefrom. Barb assemblies 200 may include corresponding alignment holes 208 for enabling efficient placement of barb assemblies 202 into barb engagement portion 167 during assembly of poke-through device 110. In addition, barb assemblies 200 may include mounting holes 208 aligned with mounting holes 170 in barb mounting plate 110 (described below).

In addition, as shown in FIG. 4, upper surface 162 of barb mounting ring 110 includes an annular projection 169 projecting therefrom. Annular projection 169 provides an additional engagement portion for poke-through device 100 that aids barb assemblies 168 in grippingly engaging the through hole 502 in concrete floor 500 during installation of poke-through device 100. As described below, when cover support frame 112 is inserted within barb mounting ring 110 barb mounting ring 110 is reinforced by the lower portion of cover support frame 112, thereby increasing the circular wall strength of barb mounting ring 110.

As shown in FIG. 2A, barb mounting ring 110 includes a number of mounting holes 170 therethrough that align with top mounting tabs 120 in tubular main body 102 and mounting holes 154 in device frame 108. Similar mounting holes 171 in cover support frame 112 also align with the mounting holes 170 in barb mounting ring 110. During assembly, screws 172 are inserted into mounting holes 171 and downwardly through mounting holes 210 in barb assembly body portions 202, mounting holes 170 in barb mounting ring 110, top mounting tabs 120 in tubular main body 102, and mounting holes 154 in device frame 108 to secure cover support frame 112, barb mounting ring 110, and device frame 108 to main body 102.

As briefly described above, cover support frame 112 engages upper surface 162 of barb mounting ring 110 and is configured to engage cover mounting plate 114. As shown in FIG. 2A, cover support frame 112 includes a generally tubular configuration that includes angled or beveled outer walls that engage upper surface 162 of barb mounting ring 110. As described above, cover support frame 112 includes mounting holes 170 that align with the mounting holes in barb mounting ring 110 to facilitate securing cover support frame 112 to barb mounting ring 110 and main body 102. In addition, cover support frame 112 includes threaded cover mounting holes 174 for aligning with corresponding holes in cover mounting plate 114 to facilitate securing of cover mounting plate 114 to cover support frame 112 via screws 176.

Cover mounting plate 114 includes a flange portion 178 configured to rest on an upper surface of flooring 506 (FIG. 5) on concrete floor 500 following insertion of tubular main body 102 into hole 502. As shown in FIG. 4, flange portion 178 may be provided with an angled or sloped outer periphery for reducing the likelihood that people or furniture will catch on cover mounting plate 114 during movement. Flange portion 178 of cover mounting plate 114 defines an access opening 180 for providing access to handwell cavity 156 when poke-through device 100 is assembled and installed within floor 500. Flange portion 178 is further configured to receive cover 116 to enclose access opening 180. As described above, cover mounting plate 114 is secured to cover support frame 112 via screws 176. In one embodiment, as shown in FIG. 2A, cover mounting plate 114 includes a recessed portion 182 for receiving cover 116 to allow for an upper surface of cover 116 to be substantially flush with an upper surface of flange portion 178 when in the closed position (FIGS. 1, 3, 4, and 5B). As shown in FIG. 4, cover mounting plate 114 may include a latching mechanism generally referred to at 184 to facilitate securing cover 116 to cover mounting plate 114. In some embodiments, latching mechanism 184 may also facilitate opening or removal of cover 116.

As shown in FIG. 2A, cover 116 comprises a generally planar body having a shape or configuration corresponding to a shape or configuration of recessed portion 182. In some embodiments, cover 116 may be configured to engage latching mechanism 184 when in the closed position, as shown in FIG. 2A.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A poke-through device, comprising:
   a tubular main body sized for insertion into a hole formed through a concrete floor, wherein the tubular main body comprises an upper portion and a lower portion;
   a device frame mounted within the upper portion of the tubular main body for mounting one or more electrical devices;
   a tubular intumescent insert mounted within the lower portion the tubular main body below the device frame;
   a junction box assembly mounted to a bottom end of the tubular main body; and
   a cover assembly configured to enclose an opening in a top end of the tubular main body,
   wherein the tubular intumescent insert is mounted in the tubular main body so as to not contact the device frame to allow intumescent material to flow around the device frame in the event of a fire.

2. The poke-through device of claim 1, wherein the device frame is coupled to the cover assembly to suspend the device frame entirely within the tubular main body.

3. The poke-through device of claim 2, wherein the device frame, when installed in the tubular main body, does not contact a sidewall of the tubular main body to allow the intumescent material to flow around the device frame in the event of a fire.

4. The poke-through device of claim 1, wherein the device frame further comprises:

a device mounting platform having one or more openings for receiving the one or more electrical devices; and a voltage divider mounted below the device mounting platform to separate wiring coupled to the one or more electrical devices, wherein the voltage divider includes one or more openings aligned with the one or more openings in the device mounting platform.

5. The poke-through device of claim 4, wherein the device mounting platform and the voltage divider comprise different materials.

6. The poke-through device of claim 5, wherein the device mounting platform comprises a metal and the voltage divider comprises one of a plastic or polymer.

7. The poke-through device of claim 4, wherein the device mounting platform comprises one or more standoffs for positioning the device mounting platform in a recessed configuration within the tubular main body, wherein the recessed configuration of the device mounting platform within the tubular main body forms a handwell cavity within the tubular main body for accommodating plugs, connectors, or wires connected to the one or more electrical devices below a surface of the concrete floor.

8. The poke-through device of claim 7, wherein the one or more standoffs are configured to engage one or more upper mounting tabs in the tubular main body to secure the device frame within the tubular main body in the recessed configuration.

9. The poke-through device of claim 1, wherein the intumescent insert comprises a first half and a second half aligned together upon insertion into the tubular main body.

10. The poke-through device of claim 9, wherein the intumescent insert comprises one or more openings configured to align with the one or more electrical devices.

11. The poke-through device of claim 1, wherein the intumescent insert and the junction box are mounted to the bottom end of the tubular main body by bottom mounting tabs.

12. The poke-through device of claim 1, wherein the cover assembly further comprises:

a barb ring mounted to a top end of the tubular main body, wherein the barb ring comprises a plastic or polymer.

13. The poke-through device of claim 12, wherein a lower surface of the barb ring comprises a plurality of radially spaced notches configured to allow the intumescent material to flow between the tubular main body and the barb ring in the event of a fire.

14. The poke-through device of claim 12, wherein a portion of the barb ring comprises one or more barb assemblies configured to engage of sidewall of the hole in the concrete floor upon installation of the cover assembly.

15. The poke-through device of claim 14, wherein the one or more barb assemblies are formed of metal, and each comprise:

a body portion; and a plurality of barb portions projecting upwardly from the body portion, wherein the plurality of barb portions project in a direction opposite to a direction of insertion of the poke-through device into the hole in the concrete floor.

16. The poke-through device of claim 1, wherein the junction box comprises a top plate, a plurality of sidewalls, and a bottom, wherein at least some of the plurality of sidewalls comprises openings therethough for providing access to an interior of the junction box, wherein the openings are covered by replaceable covers.

17. The poke-through device of claim 16, wherein the replaceable covers comprise knock-out portions which may be removed to accommodate insertion of a wiring conduit therethrough.

18. The poke-through device of claim 16, wherein the plurality of sidewalls are formed in an octagonal configuration.

19. The poke-through device of claim 16, wherein the bottom of the junction box further comprises:

a number of individually removable bottom plates, wherein each of individually removable bottom plates comprises a conduit opening therethrough for receiving a wiring conduit; and a number of conduit plugs for insertion into the conduit openings to selectably close the conduit openings prior to insertion of the wiring conduit.

20. An intrafloor receptacle device for insertion into a through hole in a concrete floor, comprising:

a main body sized for insertion into the through hole, wherein the main body comprises an upper end and a lower end;

a device frame mounted in the upper end of the main body for mounting one or more electrical devices within the intrafloor receptacle device;

an intumescent insert mounted in the lower end of the main body;

a junction box assembly mounted beneath the lower end of the main body;

a barb ring mounted to the top end of the main body, wherein the barb ring comprises a plastic or polymer, wherein a lower surface of the barb ring comprises a plurality of radially spaced notches configured to allow intumescent material from the intumescent insert to flow between the main body and the barb ring in the event of a fire; and a cover assembly configured to enclose an opening in the barb ring.

21. The intrafloor receptacle device of claim 20, wherein the intumescent insert is mounted in the lower end tubular main body so as to not contact the device frame, to allow the intumescent material to flow around the device frame in the event of a fire.

22. The intrafloor receptacle device of claim 21, wherein the device frame is coupled to the barb ring to suspend the device frame within the tubular main body, wherein the device frame, when installed in the main body, does not contact a sidewall of the main body to allow the intumescent material to flow around the device frame in the event of a fire.

23. The intrafloor receptacle device of claim 22, wherein the device frame further comprises:

a device mounting platform having one or more openings for receiving the one or more electrical devices; and a voltage divider mounted below the device mounting platform to separate wiring coupled to the one or more electrical devices, wherein the voltage divider includes one or more openings aligned with the one or more openings in the device mounting platform, wherein the device mounting platform and the voltage divider comprise different materials.

24. The intrafloor receptacle device of claim 20, wherein the intumescent insert comprises a first half and a second half aligned together upon insertion into the lower end of the main body.

25. The intrafloor receptacle device of claim 20, wherein a lower surface of the barb ring comprises a plurality of radially spaced notches configured to allow the intumescent material to flow between the tubular main body and the barb ring in the event of a fire.

26. The intrafloor receptacle device of claim 20, wherein a portion of the barb ring comprises one or more barb assemblies configured to engage of sidewall of the hole in the concrete floor upon installation of the cover assembly.

27. A poke-through device, comprising:
   a tubular main body sized for insertion into a hole formed through a concrete floor;
   a device frame mounted within an upper portion of the tubular main body for mounting one or more electrical devices,
   wherein the device frame comprises a device mounting platform having one or more openings for receiving the one or more electrical devices and a voltage divider mounted below the device mounting platform to separate wiring coupled to the one or more electrical devices,
   wherein the voltage divider includes one or more openings aligned with the one or more openings in the device mounting platform,
   wherein the device mounting platform and the voltage divider comprise different materials;
   an intumescent insert mounted within a lower portion of the tubular main body below the device frame;
   a junction box assembly mounted to a bottom end of the tubular main body; and
   a cover assembly configured to enclose an opening in a top end of the tubular main body,
   wherein the intumescent insert is mounted in the tubular main body so as to not contact the device frame to allow intumescent material to flow around the device frame in the event of a fire,
   wherein the device frame is coupled to the cover assembly to suspend the device frame entirely within the tubular main body,
   wherein the device frame, when installed in the tubular main body, does not contact a sidewall of the tubular main body to allow the intumescent material to flow around the device frame in the event of a fire.

28. The poke-through device of claim 27, wherein the cover assembly further comprises:
   a barb ring mounted to a top end of the tubular main body, wherein the barb ring comprises a plastic or polymer,
   wherein a lower surface of the barb ring comprises a plurality of radially spaced notches configured to allow the intumescent material to flow between the tubular main body and the barb ring in the event of a fire.

* * * * *